United States Patent

[11] 3,588,016

| [72] | Inventors | Theodor Reinhard<br>Boblingen;<br>Ernst Haug, Maichingen, Germany |
|---|---|---|
| [21] | Appl. No. | 787,319 |
| [22] | Filed | Dec. 27, 1968 |
| [45] | Patented | June 28, 1971 |
| [73] | Assignee | Daimler-Benz Aktiengesellschaft<br>Stuttgart-Unterturkheim, Germany |
| [32] | Priority | Dec. 29, 1967 |
| [33] | | Germany |
| [31] | | P 16 30 406.6 |

[54] MOUNTING ARRANGEMENT FOR THE BASE OF AN ORNAMENTAL FIGURE
32 Claims, 4 Drawing Figs.

[52] U.S. Cl............................................................. 248/204,
52/113, 287/21
[51] Int. Cl........................................................... B60r 27/00
[50] Field of Search............................................. 248/204,
284, 278, 478, 479, 481, 483, 484; 52/113, 116;
287/21; 94/1.5; 180/89; 280/(Inquired);
296/(Inquired)

[56] References Cited
UNITED STATES PATENTS

| 1,443,204 | 1/1923 | Bernstein .................. | 52/113X |
| 2,095,016 | 10/1937 | Waterbor .................. | 94/1.5 |
| 2,153,095 | 4/1939 | McKinley .................. | (248/278UX) |

FOREIGN PATENTS

| 854,884 | 11/1960 | Great Britain .............. | 248/483 |

*Primary Examiner*—Edward C. Allen
*Assistant Examiner*—J. Franklin Foss
*Attorney*—Craig, Antonelli, Stewart & Hill ABSTRACT: A mounting arrangement for the base of an ornamental figure, particularly at the front end of a motor vehicle, in which a bracket secured at the vehicle includes a bearing part with a ball-shaped socket on which the base of the ornamental figure is pivotably supported while the bearing part is movable with respect to the bracket and is supported with respect thereto by elastic means.

PATENTED JUN 28 1971    3,588,016
FIG.1
FIG.3
FIG.2
FIG.4
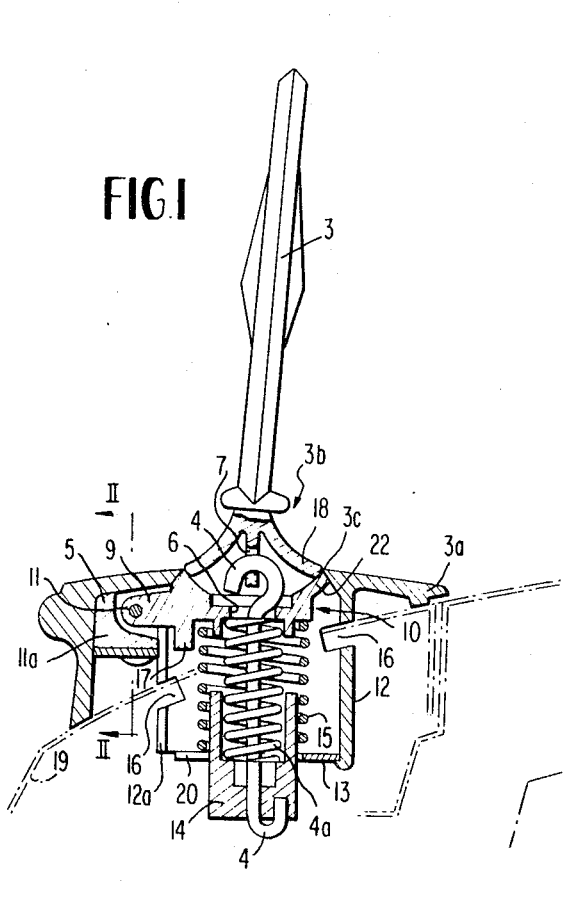
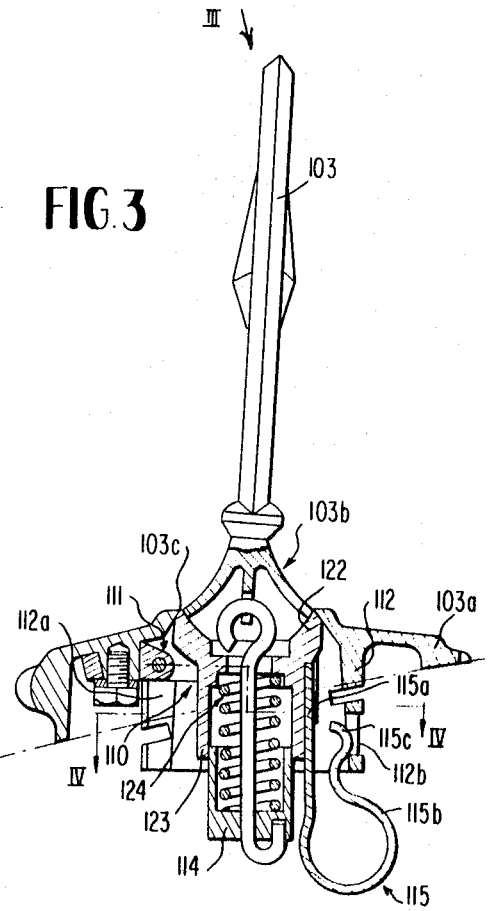
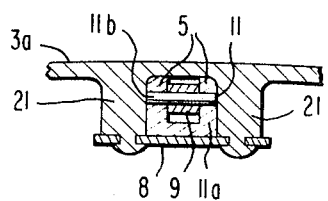
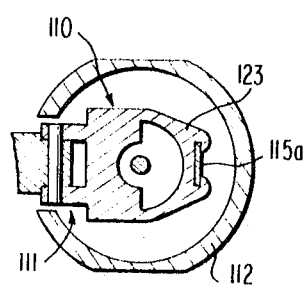
INVENTORS
THEODOR REINHARD
ERNST HAUG
BY
ATTORNEYS 3,588,016

MOUNTING ARRANGEMENT FOR THE BASE OF AN ORNAMENTAL FIGURE

The present invention relates to the fastening of the base of an ornament figure at the front end of a motor vehicle in which a bracket secured at the vehicle includes a bearing support part with a ball-shaped socket on which the base is pivotably supported.

With a known fastening arrangement of this type, the base is secured at the bearing support part by springy means. With this prior arrangement the ornament figure can yield or tilt under lateral impacts so that injuries are far-reachingly avoided.

The aim of the present invention resides in improving the known mounting arrangement. For this purpose, according to the present invention the bearing support part is movably arranged at the bracket, and these parts are mutually braced or supported with respect to one another by elastic means. A mounting and fastening is created by the present invention in which the ornamental figure can also yield under impacts impinging on the ornament figure from above so that the safety against injury danger is improved. Guide means may be arranged between the bearing support part and the bracket, by means of which the bearing support part is forcibly returned again into its original position with respect to the bracket. In the most simple manner a hinge may be provided for the connection of these two parts. The advantage of this arrangement resides in that the collapsing of the ornament figure, which is advantageous for the purpose of avoiding injuries, is favored also with the impacts impinging on the figure from above. An aperture may be provided in the bracket which is closed by the movable bearing support part in a coverlike manner. The ornament figure is thereby in part lowerably secured at the vehicle front.

Accordingly, it is an object of the present invention to provide a fastening and mounting arrangement for the base of an ornament figure at the front end of a motor vehicle which avoids the drawbacks and shortcomings encountered in the prior art.

Another object of the present invention resides in a fastening of an ornament figure at the front end of a motor vehicle which far-reachingly protects against the danger of injury.

A still further object of the present invention resides in an ornament figure mounting for motor vehicles which is able to yield in case of impacts with both horizontal and/or vertical force components.

These and other objects, features, and advantages of the present invention will become more obvious from the following description when taken in connection with the accompanying drawing which shows, for purposes of illustration only, two embodiments in accordance with the present invention, and wherein:

FIG. 1 is a longitudinal cross-sectional view through a first embodiment of a mounting of a Mercedes-Star in accordance with the present invention.

FIG. 2 is a cross-sectional view taken along line II–II of FIG. 1.

FIG. 3 is a longitudinal cross-sectional view through a second embodiment of a mounting of a Mercedes-Star in accordance with the present invention, and FIG. 4 is a cross-sectional view taken along line IV–IV of FIG. 3.

Referring now to the drawing wherein like reference numerals are used throughout the various views to designate like parts, in the mounting arrangement of the Mercedes-Star 3 illustrated in the embodiment according to FIGS. 1 and 2, the base thereof generally designated by reference numeral 3b is provided with a ball-shaped bearing part 18 which is pivotably supported on a ball-shaped socket 22. The ball socket 22 is rigidly connected with a bearing support part generally designated by reference numeral 10 which is pivotably secured at the bracket 3a by means of a hinge joint 11. The bearing support part 10 is yieldingly or elastically supported by way of a coil spring 15 with respect to the bracket 3a. The coil spring 15 is supported, in its turn, with its end opposite the bearing support part 10, at a disc 13 which is secured at the free end of a fixed cylindrical bracket part 12. The bracket part 12 is provided with slot-shaped apertures 16 which serve for the mounting and fastening (not shown) of the bracket 3a at the radiator body cover panel, indicated schematically by reference numeral 19. The bracket part 12 is further provided with a longitudinal slot 12a through which extends movably a tongue-shaped hinge part 9 of the bearing support part 10. A U-shaped hinge part 11a is secured at the bracket 3a, between whose leg portions 5 the hinge part 9 engages movably. The hinge parts 5 and 9 are pivotably connected with each other by a bolt 11b (FIG. 2). The mounting and securing of the hinge part 11a on the side of the bracket is provided with a retainer plate 8 which is riveted to the end faces of two parallel riblike bracket parts 21. In this manner a housing like mounting support is formed into which the hinge part 11a is inserted form-lockingly.

The bearing support part 10 is provided with an aperture 6 and the bracket with an aperture 3c for the passage of a tie rod 4. The tie rod 4 is inserted into an eyelet 7 of the base 3b and is connected at its other end with a pot-shaped spring plate 14. A compression spring 4a is arranged concentrically between tie rod 4 and spring plate 14 which is supported at one end at the support part 10 and at the other end at the spring plate 14.

For purposes of achieving a compact arrangement the securing parts 4, 4a and 14 are arranged concentrically within the compression spring 15. In order that the pivotal movement of the support part 10 is not impaired by the part 4, 4a and 14, a slot opening 20 is provided in the disc 13 for the compression spring 15, through which the spring plate 14 extends with sufficient play.

For the purpose of limiting the movement of the bearing support part 10, an abutment 17 is provided at the latter which comes into abutment at the bracket part 12 during inward pivotal movement. The springs 4a and 15 as well as the associated fastening means are protected by these measures against damages as a result of the pivotal support part 10.

The ball-jointlike support of the base 3b on the ball socket 22 and the elastic connection of these two parts by means of coil spring 4a are known, as such, and serve the purpose that the star 3 is able to deflect or fold over with lateral impacts and is able to pivot back automatically into its upright position.

The mounting according to the present invention illustrated in FIGS. 1 and 2 offers essentially the following advantages:

The ball socket 22 is movably arranged with respect to the bracket 3a and is yieldingly supported by elastic means. As a result thereof, the Mercedes-Star 3 is able to yield also under the effect of the downwardly directed impacts.

The bearing support part 10 is forcibly and automatically returned by guide means (hinge 11) into its initial position after an inward spring deflection. The use of a hinge as return guide means favors the collapsing of the Mercedes-Star 3 in the ball socket 22.

The concentric arrangement of the connecting means 4, 4a and 14 inside of the coil spring 15 is space saving. This arrangement is protected against damages from the support part 10 by means of abutment cams 17.

The second embodiment of the mounting of a Mercedes-Star in FIGS. 3 and 4 differs with respect to that of FIGS. 1 and 2 essentially in that the pivotal bearing support generally designated by reference number 110 is supported at the bracket 103a by means of a U-shaped bending spring generally designated by reference numeral 115. One arm 115a of the spring 115 is securely clamped at a cylindrical mounting 123 of the bearing support part generally designated by 110. The free arm 115b is deformed at its end into a rounded-off cam 115c which engages springily into an aperture 112b of the bracket 103a. In the case of an impact which acts on the Mercedes-Star 103 in the direction of arrow III, the bearing support part 110 pivotally secured by means of a hinge generally designated by reference numeral 111 at the bracket 103a folds or collapses downwardly whereby the cam 115c disengages out of the aperture 112b. This type of fastening offers the advantage that the bearing support part 110 is not impaired during its pivotal movement by the yielding means (bending spring 115 or by other parts). The bending spring 115 can also be clamped to the bracket and may engage at a detent of the bearing support part.

The spring plate 114 for the springy connection generally designated by reference numeral 124 between the base 103b and the ball socket 122 is telescopically displaceably arranged in the cylindrical mounting 123 of the bearing support part 110 so that the connection 124 is closed in a capsule like manner and is protected against soiling. A further advantage of this construction resides in that during the pivoting of the bearing support part 110, no foreign parts engage into the connection 124 and could thereby block the folding or tilting over of the star 103.

The cylindrical bracket part 112, in which is provided the aperture 112b for the bending spring 115, includes a slot 112a so that the movability of bearing support part 110 is not impaired or reduced by the bracket 112.

Corresponding to the first embodiment of FIGS. 1 and 2, a circularly shaped aperture 103c is provided in the bracket 103a which is covered off in a coverlike manner by the bearing support part 110.

While we have shown and described two embodiments in accordance with the present invention, it is understood that the same is not limited thereto but is susceptible of numerous changes and modifications as known to a person skilled in the art and we therefore do not wish to be limited to the details shown and described herein but intend to cover all such changes and modifications as are within the scope of those skilled in the art.

We claim:

1. A mounting arrangement of the base of an ornament at the end of a motor vehicle, in which a bracket secured at the vehicle includes support means with substantially ball-shaped socket means on which the base of the ornament is pivotably supported, characterized in that the support means is movably arranged in approximately the vertical direction with respect to the bracket, and yielding means for supporting with respect to one another the two parts consisting of support means and bracket.

2. An arrangement according to claim 1, wherein guide means are arranged between the support means and the bracket.

3. An arrangement according to claim 2, wherein the support means is pivotably connected with the bracket by hinge means.

4. An arrangement according to claim 3, wherein the support means closes in a coverlike manner an aperture means provided in the bracket.

5. An arrangement according to claim 4, wherein at least one weblike bracket part is arranged in proximity to the aperture means, said weblike bracket part being provided at the end thereof opposite the aperture means with retaining means for the yielding means.

6. An arrangement according to claim 5, wherein a compression spring is inserted between said support means and said retaining means, the connecting means between the base and the support means being arranged with said spring.

7. A mounting arrangement of the base of an ornament at the end of a motor vehicle, in which a bracket secured at the vehicle includes support means with substantially ball-shaped socket means on which the base of the ornament is pivotably supported, the support means being movably arranged with respect to the bracket, yielding means for supporting with respect to one another the two parts consisting of support means and bracket, at least one weblike bracket part is arranged in proximity to the aperture means, said weblike bracket part being provided at the end thereof opposite the aperture means with retaining means for the yielding means, a compression spring inserted between said support means and said retaining means, the connecting means between the base and the support means being arranged with said spring, and guide means arranged between the support means and the bracket, wherein the support means is pivotably connected with the bracket by hinge means and closes in a coverlike manner an aperture means provided in the bracket, and wherein the retaining means is provided with an aperture for the passage of the connecting means between the base and the support means.

8. An arrangement according to claim 7, wherein said retaining means is a disclike element.

9. An arrangement according to claim 7, further comprising abutment means between said support means and said bracket.

10. An arrangement according to claim 9, wherein one hinge part of said hinge means is form-lockingly inserted into a housinglike mounting means of the bracket.

11. An arrangement according to claim 10, wherein said housing like mounting means is a bracket part.

12. An arrangement according to claim 10, wherein said housing like mounting means is a retainer plate.

13. An arrangement according to claim 10, wherein the bracket includes two riblike essentially parallel bracket parts.

14. An arrangement according to claim 13, wherein a retainer plate plate is secured at the ends of the riblike bracket parts.

15. A mounting arrangement of the base of an ornament at the end of a motor vehicle, in which a bracket secured at the vehicle includes support means with substantially ball-shaped socket means on which the base of the ornament is pivotably supported, the support means being movably arranged with respect to the bracket, yielding means for supporting with respect to one another the two parts consisting of support means and bracket, guide means arranged between the support means and the bracket, and at least one weblike bracket part arranged in proximity to the aperture means, said weblike bracket part being provided at the end thereof opposite the aperture means with retaining means for the yielding means, wherein the support means is pivotably connected with the bracket by hinge means and closes in a coverlike manner an aperture means provided in the bracket, and wherein elastic means between the bracket and said support means are clamped at one of the two last-mentioned parts and springily engage in a detent at the other of said two parts.

16. An arrangement according to claim 15, wherein said detent is formed by an aperture.

17. An arrangement according to claim 16, wherein said one part is the support means and said other part is the bracket.

18. An arrangement according to claim 15, wherein a U-shaped bending spring is provided whose one leg portion is securely clamped at the support means.

19. An arrangement according to claim 18, wherein the free leg portion of the bending spring is provided with a cam which is adapted to engage in an aperture in the bracket.

20. An arrangement according to claim 19, wherein a pot-shaped spring plate is telescopically displaceable in a cylindrical mounting of the support means.

21. An arrangement according to claim 1, wherein the support means is pivotably connected with the bracket by hinge means.

22. An arrangement according to claim 1, wherein the support means closes in a coverlike manner an aperture means provided in the bracket.

23. A mounting arrangement of the base of an ornament at the end of the motor vehicle, in which a bracket secured at the vehicle includes support means with substantially ball-shaped socket means on which the base of the ornament is pivotably supported, the support means being movably arranged with respect to the bracket and closes in a coverlike manner an aperture means provided in the bracket, and yielding means for supporting with respect to one another the two parts consisting of support means and bracket, wherein at least one weblike bracket part is arranged in proximity to the aperture means, said weblike bracket part being provided at the end thereof opposite the aperture means with retaining means for the yielding means.

24. An arrangement according to claim 23, wherein a compression spring is inserted between said support means and said retaining means, the connecting means between the base and the support means being arranged with said spring.

25. An arrangement according to claim 24, wherein the said retaining means is provided with an aperture for the passage of the connecting means between the base and the support means.

26. An arrangement according to claim 24, wherein said retaining means is a disclike element.

27. An arrangement according to claim 1, further comprising abutment means between said support means and said bracket.

28. An arrangement according to claim 21, wherein one hinge part of said hinge means is form-lockingly inserted into a housinglike mounting means of the bracket.

29. A mounting arrangement of the base of an ornament at the end of a motor vehicle, in which a bracket secured at the vehicle includes support means with substantially ball-shaped socket means on which the base of the ornament is pivotably supported, the support means being movably arranged with respect to the bracket, and yielding means for supporting with respect to one another the two parts consisting of support means and bracket, wherein elastic means between the bracket and said support means are clamped at one of the two last-mentioned parts and springily engage in a detent at the other of said two parts.

30. An arrangement according to claim 29, wherein a U-shaped bending spring is provided whose one leg portion is securely clamped at the support means.

31. An arrangement according to claim 30, wherein the free leg portion of the bending spring is provided with a cam which is adapted to engage in an aperture in the bracket.

32. An arrangement according to claim 29, wherein a pot-shaped spring plate is telescopically displaceable in a cylindrical mounting of the support means.